CHARLES STUBENBORD.

Improvement in Sewer-Traps.

No. 126,759. Patented May 14, 1872.

Witnesses.
Robert Gillen
Alex. L. Macnab

Inventor:
Charles Stubenbord

UNITED STATES PATENT OFFICE.

CHARLES STUBENBORD, OF NEW YORK, N. Y.

IMPROVEMENT IN SEWER-TRAPS.

Specification forming part of Letters Patent No. 126,759, dated May 14, 1872.

Specification describing a Self-Acting or Automatic Trap for the Main Sewers, invented by CHARLES STUBENBORD, of New York, in the county and State of New York.

My invention consists in a trap for the main sewers for the purpose of preventing the re-entering of the fetid gases into the dwellings, as well as for the purpose of stopping rats from gaining access into the same.

Figure 1:
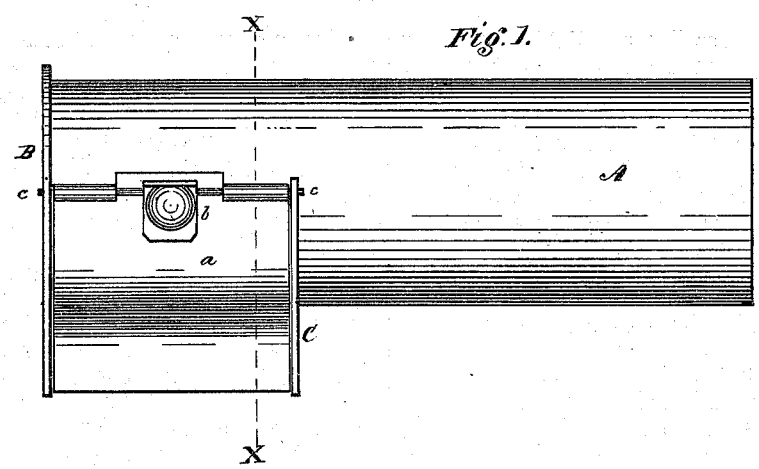
Figure 2:
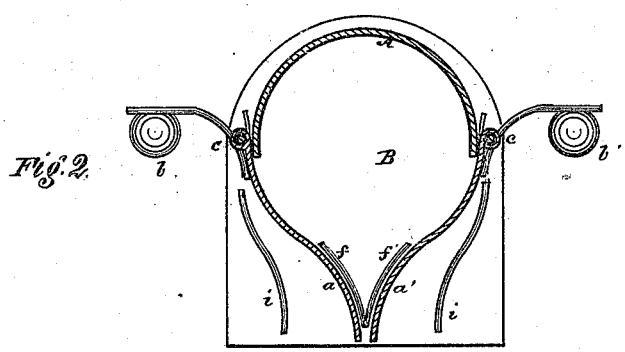

Figure 1 is a side elevation of my trap. Fig. 2 is a transverse section, showing those parts which are at the left hand of the line $xx$ drawn across Fig. 1.

A is a pipe or tube, of metal, tapering slightly on the left end. B is a plate, partially square, closing the left end. C is a projecting flange, attached to the pipe or cast with it like the former. It runs parallel with B, the distance from the latter being from three to six inches, according to the size of the waste-pipe. $a\ a'$ are side doors or valves, to which the weights or equipoises $b\ b'$ are attached. They turn on the hinges $c\ c'$ and perfectly balanced, so that they will open readily if there is any sewage in the pipe, and shut perfectly air or water tight when the latter has run out. $f f'$ and $i\ i'$ are rims, having partially the form of the valves or doors. The former serve as support, while the latter serve to prevent the doors from swinging too freely.

This trap may be made of galvanized iron, but I prefer to cast it entirely in iron. It is attached to the waste-pipe from the water-closet or any other waste-pipe leading into the sewer by simply putting a sheet of lead around the tapering end and driving it into the opening referred to.

By this trap the double end is gained of never closing the waste-pipe or pipes to the exit of sewage or gases, and of effectually closing it against the re-entrance of gases or fluids. Besides, if the wind should blow from one direction, there will only one door remain closed while the other one will open or shut freely.

Having fully described the construction and mode of operation of my self-acting trap, I claim as my invention—

A self-acting trap, having two side valves or doors, $a\ a'$, in combination with the flat side pieces B and C and the rims $f f'$ and $i\ i'$, constructed in the manner and for the purpose set forth.

CHARLES STUBENBORD.

Witnesses:
ROBERT GILLEN,
ALEXR. L. MACUAT.